United States Patent
Woo et al.

(10) Patent No.: US 9,785,000 B2
(45) Date of Patent: Oct. 10, 2017

(54) LIQUID CRYSTAL DISPLAY

(71) Applicant: Samsung Display Co., Ltd., Yongin, Gyeonggi-Do (KR)

(72) Inventors: Hwa Sung Woo, Asan-si (KR);
Byung-Chul Kim, Goyang-si (KR);
Young Gu Kim, Hwaseong-si (KR);
Min-Sik Jung, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 135 days.

(21) Appl. No.: 14/244,343

(22) Filed: Apr. 3, 2014

(65) Prior Publication Data

US 2015/0070635 A1    Mar. 12, 2015

(30) Foreign Application Priority Data

Sep. 9, 2013    (KR) .......................... 10-2013-0107998

(51) Int. Cl.
  *G02F 1/1339*    (2006.01)
  *G02F 1/1333*    (2006.01)
(52) U.S. Cl.
  CPC .... *G02F 1/133345* (2013.01); *G02F 1/13394* (2013.01); *G02F 2001/133357* (2013.01)
(58) Field of Classification Search
  CPC .................................................. G02F 1/13394
  See application file for complete search history.

(56) References Cited

U.S. PATENT DOCUMENTS

| | | | |
|---|---|---|---|
| 6,063,829 A | 5/2000 | Endou et al. | |
| 2002/0033907 A1* | 3/2002 | Oke | G02F 1/136286 349/46 |
| 2002/0191138 A1* | 12/2002 | Matsumoto | G02F 1/134363 349/141 |
| 2009/0039350 A1* | 2/2009 | Oh | H01L 27/124 257/59 |
| 2010/0053529 A1* | 3/2010 | Kanaya | G02F 1/13394 349/139 |
| 2011/0199565 A1* | 8/2011 | Kunimatsu | G02F 1/133723 349/123 |

(Continued)

FOREIGN PATENT DOCUMENTS

| | | |
|---|---|---|
| JP | 3893659 B2 | 12/2006 |
| JP | 4504665 B2 | 4/2010 |

(Continued)

*Primary Examiner* — Nathanael R Briggs
*Assistant Examiner* — Alexander Gross
(74) *Attorney, Agent, or Firm* — Cantor Colburn LLP

(57) ABSTRACT

A liquid crystal display includes a first insulation substrate, a gate line and a data line disposed on the first insulation substrate and insulated from and intersecting each other, a first passivation layer covering the gate line and the data line, a common electrode positioned on the first passivation layer and including a step-removed part, a second passivation layer covering the common electrode, a pixel electrode positioned on the second passivation layer, a second insulation substrate facing the first insulation substrate, and a main column spacer positioned on the second insulation substrate, where the step-removed part is provided by removing the common electrode at a position corresponding to the main column spacer.

19 Claims, 8 Drawing Sheets

(56) References Cited

U.S. PATENT DOCUMENTS

| | | | |
|---|---|---|---|
| 2012/0154703 A1* | 6/2012 | Yoshida | G02F 1/134309 |
| | | | 349/43 |
| 2012/0176559 A1 | 7/2012 | Fujikawa et al. | |
| 2012/0217493 A1* | 8/2012 | Lee | H01L 27/1225 |
| | | | 257/43 |
| 2013/0021552 A1 | 1/2013 | Tomioka et al. | |
| 2013/0162927 A1* | 6/2013 | Nagami | G02F 1/1339 |
| | | | 349/43 |
| 2014/0168554 A1* | 6/2014 | Son | G02F 1/134336 |
| | | | 349/43 |

FOREIGN PATENT DOCUMENTS

| | | |
|---|---|---|
| KR | 1020060005549 A | 1/2006 |
| KR | 1020060069172 A | 6/2006 |
| KR | 101261752 | 4/2013 |
| KR | 1020130048626 A | 5/2013 |

* cited by examiner

LIQUID CRYSTAL DISPLAY

This application claims priority to Korean Patent Application No. 10-2013-0107998 filed on Sep. 9, 2013, and all the benefits accruing therefrom under 35 U.S.C. §119, the entire contents of which are incorporated herein by reference.

BACKGROUND (a) Field

The invention relates to a liquid crystal display.

(b) Description of the Related Art

A liquid crystal display ("LCD"), which is one of the most common types of flat panel displays currently in use, is a display device which rearranges liquid crystal molecules of a liquid crystal layer by applying voltages to electrodes to control an amount of transmitted light.

The LCD has an advantage of easily providing a thin film shape, for example, but there is a disadvantage in that side visibility is deteriorated compared with front visibility, and in order to solve the disadvantage, various types of alignments of the liquid crystal and driving methods have been developed. As such a method for implementing a wide viewing angle, an LCD in which a pixel electrode and a common electrode are disposed on one substrate has received attention.

In the LCD, a plurality of cutouts is defined in at least one of two field generating electrodes of the pixel electrode and the common electrode, and a plurality of branch electrodes is defined by the plurality of cutouts.

In the LCD, a method of providing the alignment layer is a photo-alignment method of irradiating light to an alignment layer to control an alignment direction and an alignment angle of the liquid crystal. In the photo-alignment method, since the cutout does not need to be defined in the field generating electrode, an aperture ratio may be increased and a response time of the liquid crystal may be improved by a pretilt angle generated in the photo-alignment.

SUMMARY

As a substrate included in a liquid crystal display ("LCD") is becoming progressively thinner, an alignment layer provided by photo-alignment having somewhat low hardness may generate floating materials (particles).

The invention provides an LCD with reduced generation of floating foreign materials (particles) caused by a photo-alignment layer while providing two field generating electrodes on one display panel.

An LCD according to an exemplary embodiment of the invention includes a first insulation substrate, a gate line and a data line disposed on the first insulation substrate and insulated from and intersecting each other, a first passivation layer covering the gate line and the data line, a common electrode positioned on the first passivation layer and a step-removed part defined in the common electrode at a position corresponding to the main column spacer, a second passivation layer covering the common electrode, a pixel electrode positioned on the second passivation layer, a second insulation substrate facing the first insulation substrate, and a main column spacer positioned on the second insulation substrate, where the step-removed part is provided by removing the common electrode at a position corresponding to the main column spacer.

In an exemplary embodiment, a light blocking member positioned on the second insulation substrate may be further included, and the light blocking member and a portion of the common electrode may overlap each other.

In an exemplary embodiment, a width of the portion of the common electrode overlapped with the light blocking member may be equal to or greater than about 3 micrometers (μm).

In an exemplary embodiment, the step-removed part may have a shape corresponding to a shape of the main column spacer.

In an exemplary embodiment, the step-removed part may have a circular shape.

In an exemplary embodiment, a first alignment layer positioned on the pixel electrode and a second alignment layer positioned on the main column spacer may be further included.

In an exemplary embodiment, the first alignment layer and the second alignment layer may include a photo-aligned material.

In an exemplary embodiment, the first alignment layer and the second alignment layer may further include a photolysis material.

In an exemplary embodiment, a sub-column spacer may be further included, and the common electrode overlaps the sub-column spacer may not be removed.

In an exemplary embodiment, a thin film transistor connected to the gate line and the data line may be further included.

In an exemplary embodiment, an organic layer positioned on the first passivation layer may be further included.

In an exemplary embodiment, a color filter positioned on the second insulation substrate may be further included.

In an exemplary embodiment, a gate insulating layer covering the gate line may be further included.

According to the LCD, two field generating electrodes are disposed on one display panel and the hardness of the alignment layer provided by the photo-alignment method is increased such that the floating foreign material may be effectively prevented from being generated.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
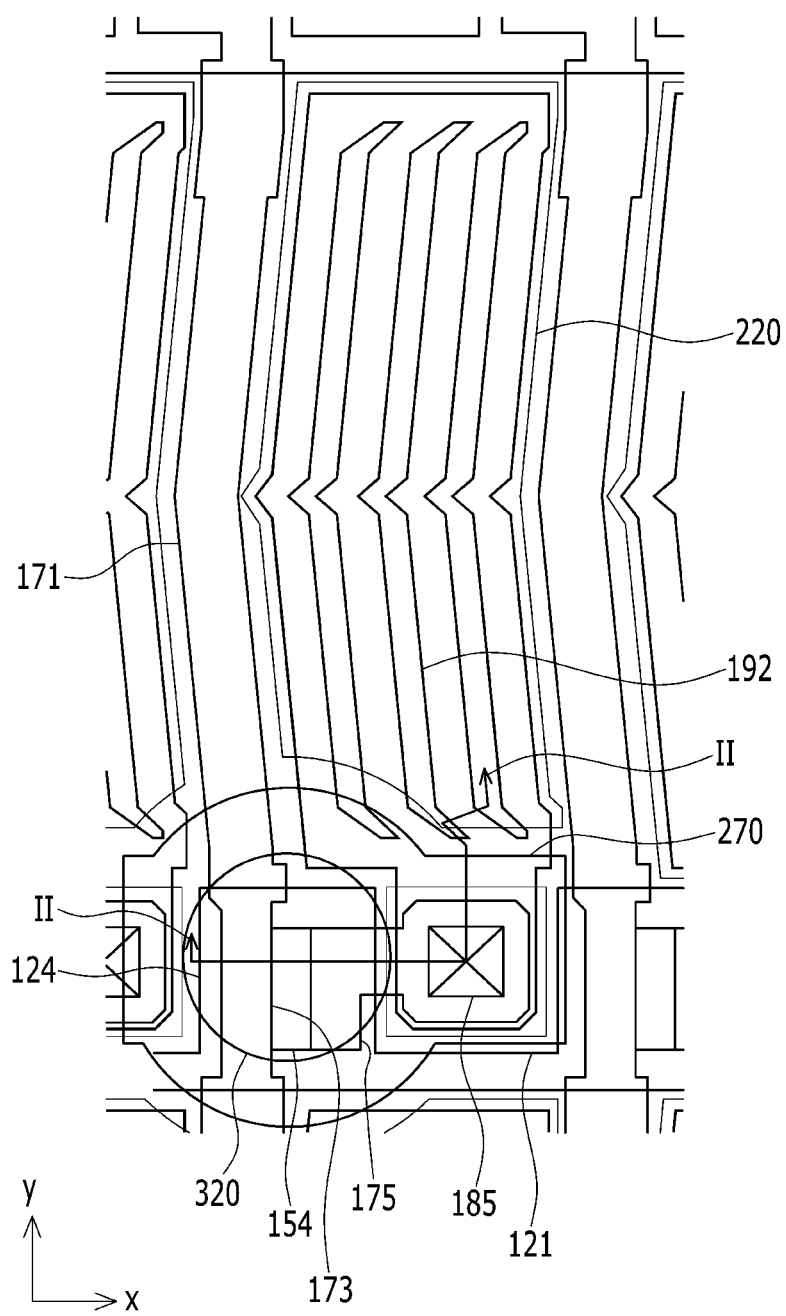
FIG. 1 is a plan view of an exemplary embodiment of one pixel of a liquid crystal display ("LCD") according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Now, a liquid crystal display ("LCD") according to an exemplary embodiment of the invention will be described with reference to drawings.

Firstly, an LCD according to an exemplary embodiment of the invention will be described with reference to FIGS. 1 to 2. FIG. 1 is a plan view of one pixel of an LCD according to an exemplary embodiment of the invention, and FIG. 2 is a cross-sectional view of the LCD of FIG. 1 taken along line II-II.

Figure 2:
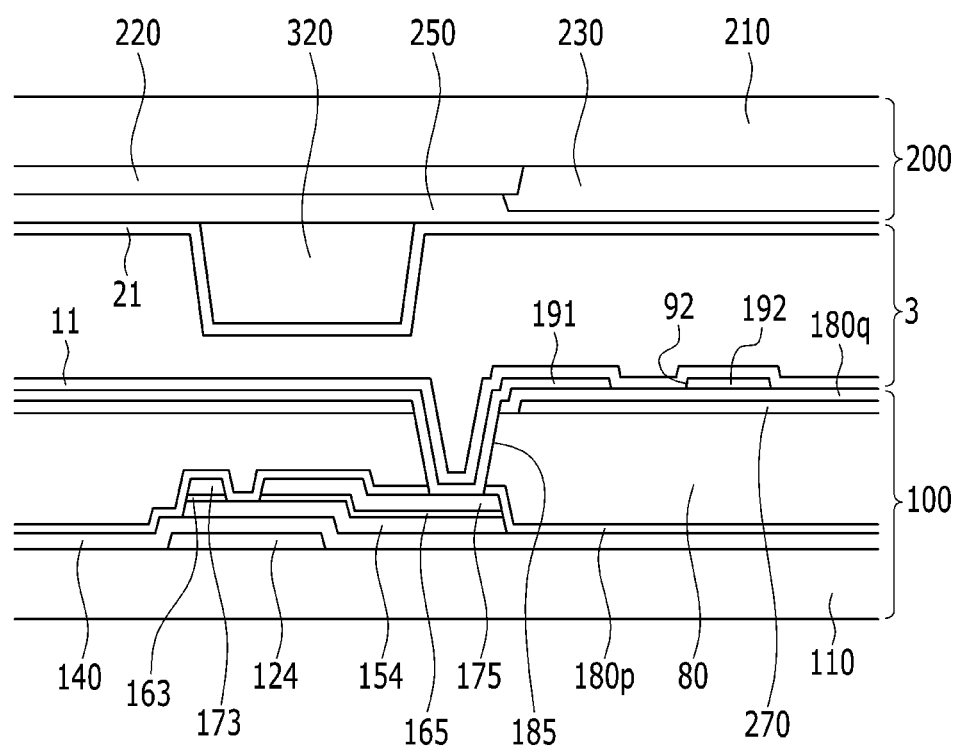
FIG. 2 is a cross-sectional view of the LCD of FIG. 1 taken along line II-II.

First, referring to FIGS. 1 and 2, the LCD according to the exemplary embodiment of the invention includes a lower display panel 100 and an upper display panel 200 that face each other and a liquid crystal layer 3 injected therebetween. One pixel area is described as an example below, but the LCD according to the exemplary embodiment of the invention may have resolution of about 200 pixels per inch (PPI) or more. That is, about 200 or more pixels may be included in a region of about 1 inch in each dimension in the LCD. Further, a horizontal length of one pixel of the LCD according to the exemplary embodiment of the invention may be about 40 micrometers (μm) or less and a vertical length thereof may be about 120 μm or less. As shown in the drawings, the horizontal length of the pixel is an interval between vertical center portions of two adjacent data lines 171 in a plan view, and the vertical length of the pixel means an interval between horizontal center portions of two adjacent gate lines 121 in a plan view.

First, the lower display panel 100 will be described.

A gate conductor including the gate line 121 is disposed on an insulating substrate 110 including transparent glass, plastics, or the like.

The gate line 121 includes a gate electrode 124, and a wide end portion (not shown) for connection with another layer or an external driving circuit. In an exemplary embodiment, the gate line 121 may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta) or titanium (Ti), for example. However, in another exemplary embodiment, the gate line 121 may have a multilayered structure including at least two conductive layers having different physical properties.

A gate insulating layer 140 including a silicon nitride (SiNx), a silicon oxide (SiOx), or the like is disposed on the gate line 121. However, in another exemplary embodiment, the gate insulating layer 140 may have a multilayered structure including at least two insulating layers having different physical properties.

A semiconductor 154 including amorphous silicon, polysilicon, or the like is disposed on the gate insulating layer 140. In an exemplary embodiment, the semiconductor 154 may include the oxide semiconductor.

Ohmic contacts 163 and 165 are disposed on the semiconductor 154. In an exemplary embodiment, the ohmic contacts 163 and 165 may include a material such as n+ hydrogenated amorphous silicon in which an n-type impurity such as phosphorus is doped at a high concentration, or a silicide. The ohmic contacts 163 and 165 may provide as a pair to be disposed on the semiconductor 154. In the case where the semiconductor 154 is the oxide semiconductor, the ohmic contacts 163 and 165 may be omitted.

A data conductor including the data line 171 including a source electrode 173 and a drain electrode 175 is disposed on the ohmic contacts 163 and 165 and the gate insulating layer 140.

The data line 171 includes a wide end portion (not shown) for connection with another layer or an external driving circuit. The data line 171 transports a data signal and extends in a substantially vertical direction to cross the gate line 121.

In this case, the data line 171 may include a first bent portion having a bent shape in order to obtain maximum transmittance of the LCD, and bent portions may meet each other in a middle region of the pixel region in a plan view to provide a V shape. A second bent portion that is bent so as to provide a predetermined angle with the first bent portion may be further included in the middle region of the pixel region.

The first bent portion of the data line 171 may be bent so as to provide an angle of about 7° with a vertical reference line y (reference line extending in a y direction) providing an angle of 90° with an extension direction (x direction) of the gate line 121 in a plan view. The second bent portion disposed in the middle region of the pixel region may be further bent so as to provide an angle of about 7 degrees)(° to about 15° with the first bent portion.

However, the shape of the data line 171 is not limited to the described shape, and the data line 171 may have any shapes such as a linear shape, for example.

The source electrode 173 is a portion of the data line 171, and is disposed on the same line as the data line 171. The drain electrode 175 is provided so as to extend in parallel to the source electrode 173. Accordingly, the drain electrode 175 is parallel to a portion of the data line 171.

The gate electrode 124, the source electrode 173 and the drain electrode 175 provide a thin film transistor ("TFT") in conjunction with the semiconductor 154, and a channel of the TFT is disposed in the semiconductor 154 between the source electrode 173 and drain electrode 175.

The LCD according to the exemplary embodiment of the invention may include the source electrode 173 positioned on the same line as the data line 171 and the drain electrode 175 extending parallel to the data line 171 to increase a width of the TFT taken in a plan view while the area of the data conductor is not increased, thus increasing an aperture ratio of the LCD.

In an exemplary embodiment, the data line 171 and the drain electrode 175 include a refractory metal such as molybdenum, chromium, tantalum and titanium, or an alloy thereof, for example, and may have a multilayered structure including a refractory metal layer (not shown) and a low resistance conductive layer (not shown). Examples of the multilayered structure may include a double layer of a chromium or molybdenum (alloy) lower layer and an aluminum (alloy) upper layer and a triple layer of a molybdenum (alloy) lower layer, an aluminum (alloy) middle layer and a molybdenum (alloy) upper layer. However, the data line 171 and the drain electrode 175 may include various metals or conductors in addition to this. The width of the data line 171 taken in a plan view may be about 3.5 µm±0.75 µm.

A first passivation layer 180p is disposed on exposed portions of the data conductors 171, 173 and 175, the gate insulating layer 140 and the semiconductor 154. The first passivation layer 180p may include an organic insulating material, an inorganic insulating material, or the like.

An organic layer 80 is positioned on the first passivation layer 180p. In another exemplary embodiment, the organic layer 80 may be omitted. In an exemplary embodiment, the organic layer 80 may be a color filter. In the case where the organic layer 80 is the color filter, the organic layer 80 may intrinsically display any one of primary colors, and examples of the primary colors may include three primary colors such as red, green and blue, and further include yellow, cyan, magenta, or the like. Although not shown in the drawings, the color filter may further include a color filter displaying a mixed color of the primary colors or white in addition to the primary colors.

A common electrode 270 is disposed on the organic layer 80. The common electrode 270 may have a surface shape and be disposed on an entire surface of the substrate 110 to have an overall plate shape, and an opening 185 may be defined in a region corresponding to a circumference of the drain electrode 175, and expose a portion of the drain electrode 175. That is, in the illustrated exemplary embodiment, the common electrode 270 may have a flat plate shape.

Common electrodes 270 disposed in adjacent pixels may be connected to each other to receive a common voltage having a predetermined magnitude supplied from the outside of the display region.

According to an exemplary embodiment of the invention, the common electrode 270 includes the surface shape, but it is removed in a region where a main column spacer 320 that is described later is provided, and the removed area is referred to as a step-removed part. When a step due to the common electrode 270 is generated, the alignment layer positioned corresponding to the step may be seriously damaged by the main column spacer 320. Accordingly, the LCD according to an exemplary embodiment of the invention removes the step through the common electrode 270 that is removed in the corresponding region, thereby reducing the damage of the alignment layer.

The step-removed part may be removed with a shape corresponding to the main column spacer 320, and one example thereof may be a circular shape. However, the invention is not limited thereto, and the step-removed part may be removed with any shapes.

When the main column spacer 320 has the circular shape, the common electrode 270 may also be removed with the circular shape corresponding thereto, and in this case, a width of an overlapping region of the light blocking member 220 and the common electrode 270 taken in a plan view may be at least 3 µm.

That is, by removing the common electrode 270, the width of the overlapping region of the common electrode 270 and the light blocking member 220 taken in a plan view may be at least 3 µm to cover the light leakage, and in a case where a width of the overlapping region is less than 3 µm, a lot of light leakage may be largely generated.

The common electrode 270 may be disposed on the entire surface of the substrate to be one plate and may have the shape having the opening 185 defined at the region corresponding to the surroundings of the drain electrode 175, and the opening 185 may be defined in the step-removed part as well as the shape corresponding to the main column spacer 320.

A second passivation layer 180q covers the common electrode 270. The second passivation layer 180q may include the organic insulating material or the inorganic insulating material.

A pixel electrode 191 is positioned on the second passivation layer 180q. The pixel electrode 191 includes a curved edge which is substantially parallel to the first curved portion and the second curved portion of the data line 171. A plurality of cutouts 92 is defined in the pixel electrode 191, and the pixel electrode 191 includes a plurality of first branch electrodes 192 defined by the plurality of cutouts 92.

A first contact hole 185 exposing the drain electrode 175 is defined in the first passivation layer 180p, the organic layer 80, the common electrode 270, and the second passivation layer 180q. The pixel electrode 191 is physically and electrically connected with the drain electrode 175 through the first contact hole 185 to receive a voltage from the drain electrode 175.

A first alignment layer 11 is coated on the pixel electrode 191 and the second passivation layer 180q, and the first alignment layer 11 includes a photo-reaction material to be photo-aligned. In an exemplary embodiment, the photo-reaction material may include a photolysis material, for example.

As described above, the photo-aligned alignment layer 11 has low hardness compared with an alignment layer provided by rubbing, but the step is removed through the removal of the common electrode 270 as described above, and the removal of the step also effectively reduces the generation of the floating material in the case of the alignment layer 11 having low hardness.

Next, the upper panel 200 will be described.

A light blocking member 220 is disposed on a second insulation substrate 210 including transparent glass or plastic, for example. The light blocking member 220 is called a black matrix and blocks light leakage.

Further, a plurality of color filters 230 is disposed on the substrate 210. In the case that the organic layer 80 of the lower panel 100 is the color filter, the color filter 230 of the upper panel 200 may be omitted. The light blocking member 220 of the upper panel 200 may also be disposed on the lower panel 100.

An overcoat 250 may be positioned on the color filter 230 and the light blocking member 220. The overcoat 250 includes an (organic) insulating material, and effectively prevents the color filter 230 from being exposed and provides a planar surface. The overcoat 250 may be omitted.

The main column spacer 320 is positioned on the overcoat 250. The main column spacer 320 maintains an interval between the upper panel 200 and the lower panel 100, and for example, may be provided at a position corresponding to the TFT of the lower panel 100. In the illustrated exemplary embodiment, the main column spacer 320 is defined on the upper panel 200, but the invention is not limited thereto, and it may be positioned in the lower panel 100 and may contact both the upper panel 200 and the lower panel 100 according to a height of the main column spacer 320 taken in a cross section.

Furthermore, a sub-column spacer (not shown) may be positioned on the overcoat 250. The sub-column spacer may have various heights to achieve a stress distribution effect against various types of front end stresses, differently from the main column spacer 320.

The sub-column spacer has a lower height than the main column spacer 320 such that the sub-column spacer does not generate damage to the alignment layer, like the main column spacer 320. Accordingly, a configuration for removing the common electrode 270 of the region corresponding to the main column spacer 320 is not used, and the common electrode 270 positioned at the region corresponding to the sub-column spacer is not removed.

Next, a second alignment layer 21 may be disposed on the overcoat 250 and the column spacer 320.

The second alignment layer 21 includes the photo-reaction material to be photo-aligned. Particularly, the photo-reaction material may include the photolysis material. As described above, the photo-aligned alignment layer 21 has low hardness compared with an alignment layer provided by a rubbing, but the step is removed through the removal of the common electrode 270 as described above, and the removal of the step also effectively reduces the generation of the floating material in the case of the alignment layer 21 having low hardness.

The liquid crystal layer 3 includes a nematic liquid crystal material having positive dielectric anisotropy. Liquid crystal molecules of the liquid crystal layer 3 are aligned so that directions of long axes thereof are perpendicular to the panels 100 and 200, and the direction has a 90° twisted structure in a spiral form from a rubbing (alignment) direction of the alignment layer of the lower panel 100 to the upper panel 200.

The pixel electrode 191 receives a data voltage from the drain electrode 175, and the common electrode 270 receives a common voltage having a predetermined magnitude from a common voltage application unit disposed outside a display area.

The pixel electrode 191 and the common electrode 270, which are field generating electrodes, generate an electric field so that liquid crystal molecules of the liquid crystal layer 3 positioned on the two electrodes 191 and 270 rotate in a direction parallel to the direction of the electric field. Polarization of light which passes through the liquid crystal layer varies according to the rotation direction of the liquid crystal molecules determined as described above.

In the LCD according to an exemplary embodiment of the invention, by removing the common electrode of the region corresponding to the main column spacer, the weak characteristic of the hardness of the alignment layer by the photo-alignment is compensated such that an LCD having decreased foreign material under the twist structure may be realized.

Figure 3:
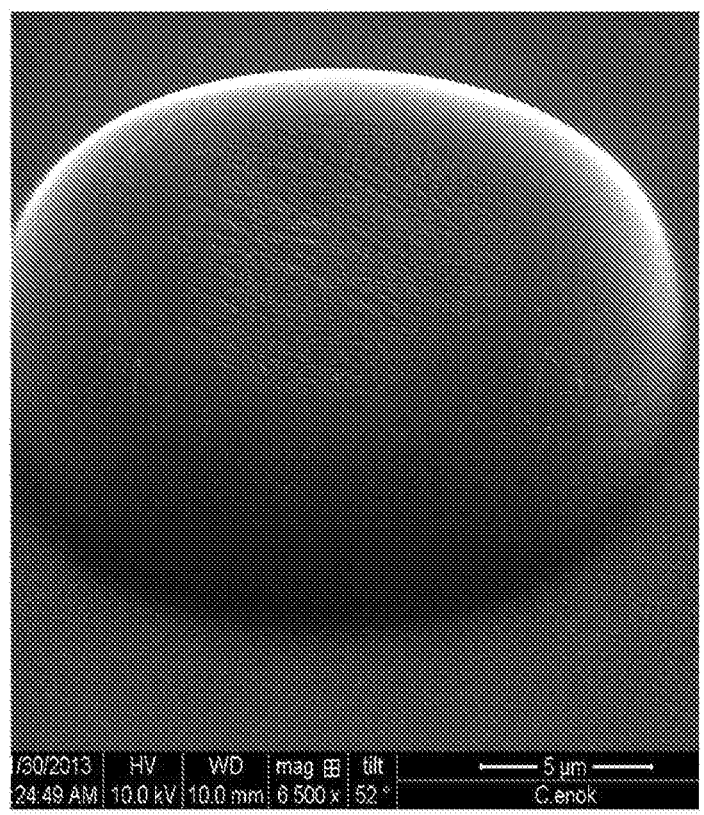
FIGS. 3 and 4 are scanning electron microscope ("SEM") images of an upper substrate and a lower substrate provided by an estimation apparatus (not shown).
Figure 4:
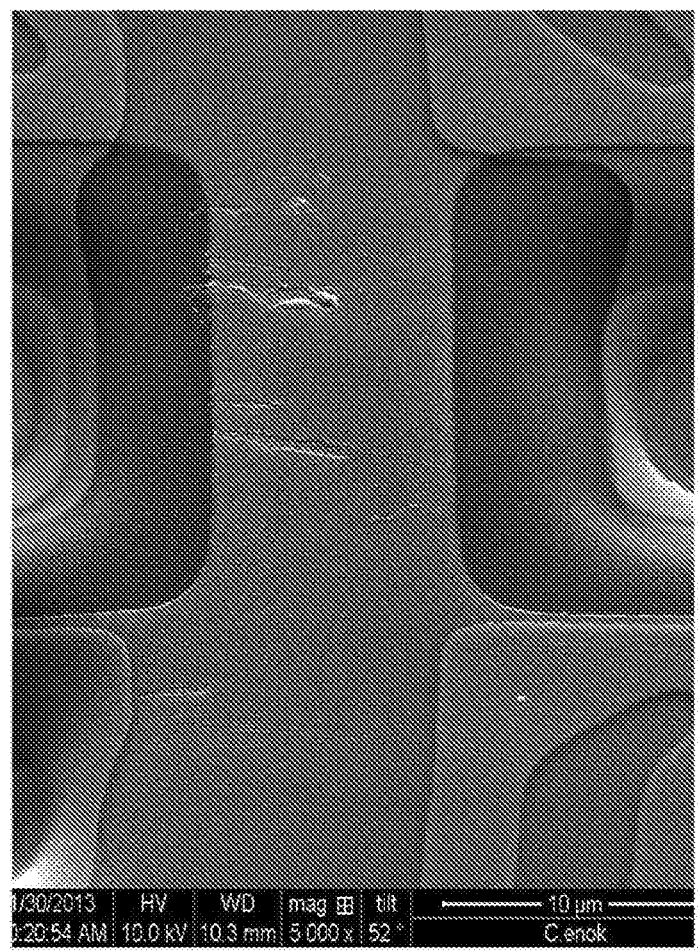

Next, the hardness of the alignment layer provided by the photo-alignment will be described through panel twist estimation. FIGS. 3 and 4 are scanning electron microscope ("SEM") images of an upper substrate and a lower substrate provided by an estimation apparatus (not shown).

An LCD is estimated through a panel twist estimation apparatus (not shown), and generation of the foreign material is measured. The generation of the floating foreign material is measured through 500 estimations for each angle.

Referring to Table 1, for an alignment layer provided by rubbing as a comparative example, a foreign material is generated near about 8 degrees of the twist, and in contrast, for the alignment layer provided by the photo-alignment layer, the foreign material is generated near about 3 degrees to about 4 degrees according to the photo-alignment material.

TABLE 1

| Estimation material | Foreign material generation average angle (500 times) |
|---|---|
| Rubbing alignment layer | 8.0 degrees |
| Photo-alignment layer A | 4.0 degrees |
| Photo-alignment layer B | 3.3 degrees |

That is, the alignment layer provided by the photo-alignment has a bad characteristic in the foreign material generation angle compared with the alignment layer provided by the rubbing. Particularly, referring to FIGS. 3 and 4, in a portion where the main column spacer and the TFT contact each other, the photo-alignment layer is weak to the floating foreign material generation caused by the front end stress, etc.

In detail, referring to FIG. 3 and FIG. 4 is a SEM image of the second alignment layer 21 in which the main column spacer 320 is positioned is damaged by the twist, and FIG. 4 is the SEM image of the first alignment layer 11 of the region where the TFT is positioned is damaged by the twist. That is, the alignment layers 11 and 21 provided by the photo-alignment have weaker strength than the alignment layer provided by the rubbing and may be easily damaged, thereby it is important to effectively reduce the foreign material generation according thereto.

Particularly, the foreign material is seriously generated in the region where the main column spacer is positioned, and this is influenced by the step due to the common electrode 270 positioned in the lower panel 100.

Next, the twist estimation is performed for the LCD in which the portion of the common electrode is removed according to an exemplary embodiment of the invention.

TABLE 2

| Estimation material | Structure | Foreign material generation average angle (500 times) |
|---|---|---|
| Rubbing alignment layer | Conventional structure | 8 degrees |
| Photo-alignment layer A | Conventional structure | 4.0 degrees |
| Photo-alignment layer A | Partial removal of a common electrode | 5.0 degrees |
| Photo-alignment layer B | Conventional structure | 3.3 degrees |
| Photo-alignment layer B | Partial removal of a common electrode | 5.3 degrees |

Referring to Table 2, while using the photo-alignment layers A and B, when removing the portion of the common electrode according to an exemplary embodiment of the invention, compared with the conventional structure, the foreign material generation average angle is increased by at least about 1 degree to about 2 degrees.

When using the photo-alignment layer, the hardness is materially low compared with the rubbing alignment layer, and in this case, the increase of the about 1 degree to about 2 degrees produces a remarkable reduction of the foreign material.

The materially low hardness of the alignment layer provided by the photo-alignment is described in Table 3.

TABLE 3

| Estimation material | Structure | Foreign material generation average angle (500 times) |
|---|---|---|
| Rubbing alignment layer | Conventional structure | 8.0 degrees |
| Photo-alignment layer A | Conventional structure | 4.0 degrees |
| Photo-alignment layer A | Partial removal of a common electrode | 5.0 degrees |
| Photo-alignment layer B | Conventional structure | 3.3 degrees |
| Photo-alignment layer B | Partial removal of a common electrode | 5.3 degrees |
| Photo-alignment layer C | Conventional structure | 7.5 degrees |
| Photo-alignment layer D | Conventional structure | 7.0 degrees |

As results for the photo-alignment layers C and D, in the case of the conventional structure, the foreign material generation average angles are about 7.5 degrees and 7.0 degrees. This photo-alignment layer has a weak material characteristic for the foreign material generation compared with the rubbed alignment layer no matter the material used.

However, in the case of the photo-alignment layers C and D, when the portion of the common electrode is removed according to an exemplary embodiment of the invention, resistance that is the same as the rubbing alignment layer or more may be obtained for the foreign material generation. Accordingly, the weakness of the hardness that is the conventional problem may be eliminated while obtaining the merit of the photo-alignment.

To effectively reduce the described foreign material generation, the LCD according to an exemplary embodiment of the invention partially removes the common electrode 270, and FIGS. 5 to 8 are images for a portion of the LCD including the step-removed part provided by partially removing the common electrode 270 according to the various exemplary embodiments of the invention.

The LCD according to the specification includes the step-removed part where the common electrode 270 is removed corresponding to the region where the main column spacer 320 is positioned, as described above. As described above, when removing the common electrode 270, the common electrode 270 must be removed to a degree of removing the step without generation of the light leakage, and this is shown in FIGS. 6 to 8.

Figure 5:
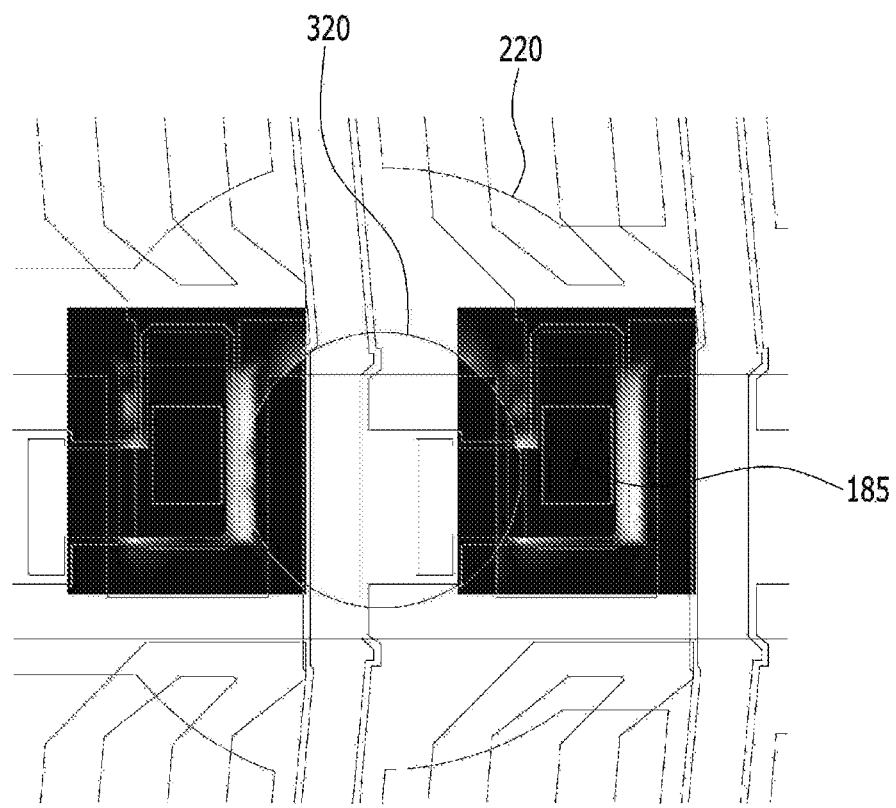
FIGS. 5 to 8 are images of an exemplary embodiment of a portion of an LCD in which a common electrode is removed according to the invention.

In detail, referring to FIG. 5, the common electrode 270 includes the one plate on the entire surface of the substrate and the opening 185 disposed at the region corresponding to the surroundings of the drain electrode 175 is defined in the common electrode 270. That is, this is the case that the common electrode 270 is also disposed in the region where the main column spacer 320 is positioned.

Figure 6:
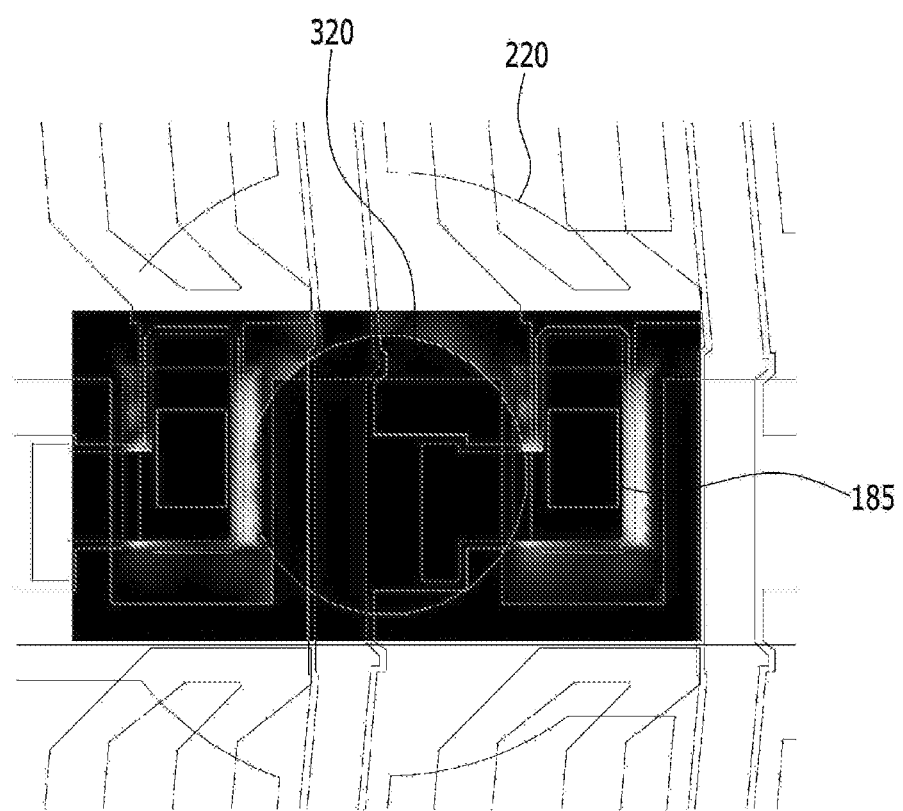

In contrast, referring to FIG. 6, the step-removed part where the common electrode 270 is removed with a rectangle shape corresponding to the region where the main column spacer 320 is positioned as well as the opening 185. The step by the common electrode 270 may be reduced through the step-removed part, but a distance from the circular main column spacer 320 to the common electrode 270 may not be uniform.

Figure 7:
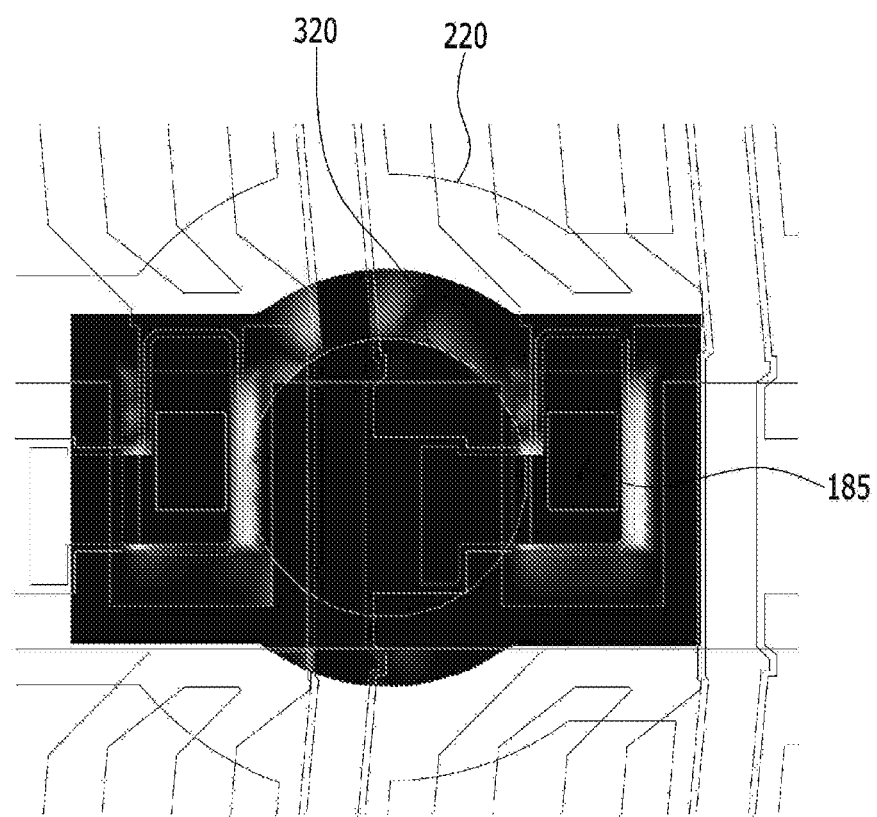
Figure 8:
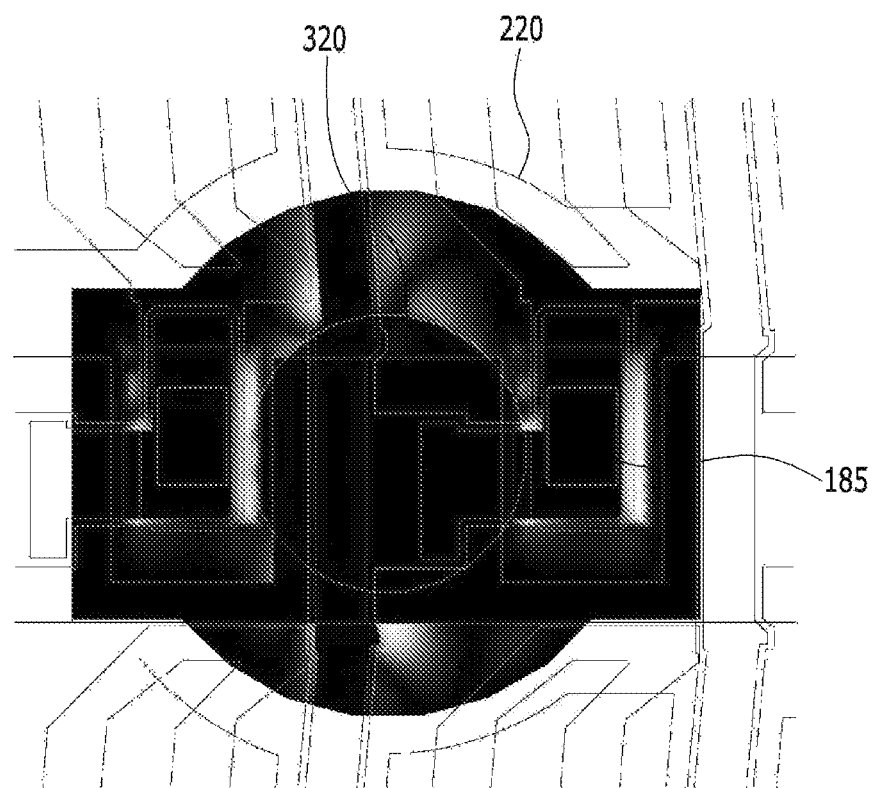

Next, referring to FIG. 7, the step-removed part of the common electrode 270 includes the opening and also has the circular shape to have a uniform distance from the main column spacer 320.

Referring to FIG. 8, the common electrode 270 is removed to a maximum in the range that the light leakage is not generated while the step-removed part has the circular shape corresponding to the main column spacer 320. In this case, the common electrode 270 and the light blocking member 220 may be overlapped by about 3 µm.

In the LCD according to an exemplary embodiment of the invention, the common electrode 270 of the region corresponding to the main column spacer 320 is removed to provide the step-removed part such that the hardness weakness of the alignment layers 11 and 21 caused by the photo-alignment is compensated, thereby providing an LCD with reduced foreign material generation by the main column spacer 320 under the twist.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
   a first insulation substrate;
   a second insulation substrate which faces the first insulation substrate;
   a main column between the first insulation substrate and the second insulation substrate;
   a gate line and a data line which are disposed on the first insulation substrate, and are insulated from and intersect each other;
   a first passivation layer which covers the gate line and the data line;
   a common electrode on the first passivation layer and a step-removed part defined in the common electrode at a position corresponding to the main column spacer;
   a second passivation layer which covers the common electrode;
   a pixel electrode on the second passivation layer; and
   a thin film transistor connected to the pixel electrode through the common electrode at the same step-removed part defined in the common electrode,
   wherein the main column has a maximum height extending from the second insulation substrate toward the first insulation substrate providing a gap between a portion of the main column facing the first insulation substrate having the maximum height and an entirety of the second passivation layer in a direction corresponding to the maximum height.

2. The liquid crystal display of claim 1, further comprising a light blocking member positioned on the second insulation substrate,
   wherein the light blocking member and a portion of the common electrode overlap each other.

3. The liquid crystal display of claim 2, wherein a width of the portion of the common electrode overlapped with the light blocking member is equal to or greater than about 3 micrometers.

4. The liquid crystal display of claim 1, wherein the step-removed part has a substantially complementary configured shape to a shape of the main column spacer in a plan view.

5. The liquid crystal display of claim 4, wherein the step-removed part and the main column spacer have a circular shape in the plan view.

6. The liquid crystal display of claim 1, further comprising:
   a first alignment layer positioned on the pixel electrode; and
   a second alignment layer positioned on the main column spacer.

7. The liquid crystal display of claim 6, wherein the first alignment layer and the second alignment layer include a photo-aligned material.

8. The liquid crystal display of claim 7, wherein the first alignment layer and the second alignment layer further include a photolysis material.

9. The liquid crystal display of claim 1, further comprising a sub-column spacer, and
   wherein the common electrode overlaps the sub-column spacer.

10. The liquid crystal display of claim 1, wherein the thin film transistor is connected to the gate line and the data line.

11. The liquid crystal display of claim 10, further comprising an organic layer positioned on the first passivation layer.

12. The liquid crystal display of claim 11, further comprising a color filter positioned on the second insulation substrate.

13. The liquid crystal display of claim 12, further comprising a gate insulating layer which covers the gate line.

14. The liquid crystal display of claim 1, wherein the gate line includes aluminum or an aluminum alloy, silver or a silver alloy, copper or a copper alloy, molybdenum or a molybdenum alloy, chromium, tantalum or titanium.

15. The liquid crystal display of claim 1, wherein the gate line has a multilayered structure including at least two conductive layers having different physical properties from each other.

16. The liquid crystal display of claim 13, wherein the gate insulating layer includes a silicon nitride or a silicon oxide.

17. The liquid crystal display of claim 1, wherein the data line includes a refractory metal including molybdenum, chromium, tantalum, titanium or an alloy thereof.

18. The liquid crystal display of claim 11, wherein the organic layer includes a color filter.

19. The liquid crystal display of claim 1, wherein the step-removed part is defined in the common electrode only at a position corresponding to both the main column spacer and the thin film transistor.

* * * * *